United States Patent Office 2,839,438
Patented June 17, 1958

2,839,438

WASH PRIMER FOR METAL SURFACES

Harold Rosenbloom, Pittsburgh, Pa., assignor to Thompson and Company, Oakmont, Pa., a corporation of Pennsylvania No Drawing. Application April 27, 1953
Serial No. 351,465

3 Claims. (Cl. 148—6.15)

This invention relates to the treatment of metal surfaces with primer coatings to provide a corrosion inhibiting base for the reception of top coating.

Various types of metal treatments have been known and used for many years to produce a phosphate coating that serves as a corrosion resistant base for protective topcoats such, for example, as air drying and thermosetting paints. More recently there have been developed the so-called wash primer compositions comprising hydroxyl-containing polyvinyl acetals, commonly polyvinyl butyral, phosphoric acid and a chromium compound in a polar organic solvent. Such wash primers may be considered as falling into two broad types. In the first of those, referred to herein as Type I, the chromium compound is supplied in the form of a basic zinc chromate; in the other, referred to herein as Type II, the chromium is supplied as lead chromate. These two types are exemplified by the following typical compositions:

|  | Type I (parts by weight) | Type II (parts by weight) |
|---|---|---|
| Base Grind: |  |  |
| Vinyl butyral resin | 7.2 | 9.0 |
| Zinc tetroxy chromate | 6.9 |  |
| Normal lead chromate |  | 8.6 |
| Magnesium silicate | 1.1 | 1.4 |
| Isopropanol 99% | 50.4 | 53.0 |
| Toluene | 14.4 |  |
| Methyl isobutyl ketone |  | 13.0 |
|  | 80.0 | 85.0 |
| Acid diluent: |  |  |
| Phosphoric acid 85% | 3.4 | 2.9 |
| Water | 3.4 | 2.9 |
| Isopropanol 99% | 13.2 | 9.2 |
|  | 20.0 | 15.0 |
|  | 100.0 | 100.0 |

In those compositions the magnesium silicate is present only to the extent necessary to act as a suspending agent for any insoluble matter.

Wash primers according to Type I have a short useful life once the phosphoric acid is added to the dispersion of basic zinc chromate in the resin solution. The addition of the acid lowers the pH of the mixture and presumably increases the solubility of the chromate in the solvent to produce a strongly oxidizing mixture. The oxidation products formed interact over a short period of time to render the composition unfit for its original purpose. In fact, Military Specification MIL-P-15328 (Ships) directs that any unused portion of such Type I primers be discarded eight hours after mixing the acid component with the pigmented base composition. That is disadvantageous for obvious reasons. Furthermore, experience has shown that Type I primers do not form visible phosphate coatings on ferrous metals, and any protective action is supposedly due to the passivating effect of a chromate film.

The Type II primers have the advantage that the fully made up compositions are stable for long periods of time and thus avoid the short life of Type I completed compositions. Experience has shown, however, that the results obtained with Type II primers are not uniform so that they are not fully reliable. When the Type II primer acts as intended it develops on the metal surface a coating of the phosphate type, presumably a ferrous phosphate. Extended experience has shown, however, that depending upon the previous history of the metal to be treated and upon normal variations in the impurities in the composition, coating formation varies from none at all to a maximum of about 85 mg. per square foot of metal surface. When phosphating does not occur the effectiveness of Type II primer is lessened. Both its adhesion to the substrate and the adhesion of topcoats to it are impaired.

A particularly serious consequence arising from the foregoing type of wash primers is due to the highly acid nature of the surface coating produced. This results in interference with the drying or curing of topcoats; in fact, even baking of, for example, alkyd resin topcoats does not develop the necessary hardness. Furthermore, certain types of topcoats adhere poorly to these wash primer coatings because of the acid nature of the surface, which acts likewise to dull or destroy the gloss of pigmented films.

It is among the objects of this invention to provide wash primers of the hydroxyl-containing polyvinyl acetal class that react rapidly with metal surfaces to consistently form uniform and adherent coatings which afford corrosion resistance and serve as satisfactory bases for the reception of protective or decorative top coatings.

A further object is to provide wash primers in accordance with the foregoing object that develop coatings which do not interfere with the drying or curing of overlying topcoatings or prevent them from developing, or cause them to lose their adherence.

Still another object is to provide wash primer coatings in accordance with the foregoing objects which when made up initially as an entity, or entire composition, have long-continued utility and avoid the disadvantage of the instability of Type I primers as known prior to this invention.

Yet another object is to provide wash primer coatings that are free from objectionable acidity in the presence of water and are consequently free from undesirable consequences of the acidity that has characterized prior wash primer treatments of Type II.

A still further object of the invention is to provide wash primers in accordance with the foregoing objects that are applicable to both Type I and also Type II wash primers.

Other objects will appear from the following specification.

As indicated by the foregoing objects, the invention is applicable to wash primers comprising solutions in polar solvents of hydroxyl-containing polyvinyl acetals. However, polyvinyl butyral is preferred because, according to my experience, it provides the best base for topcoats, and for that reason the invention will be described largely with reference to its use by way of example. Other such acetals may be used, however, for instance, polyvinyl formal. Partially hydrolyzed polyvinyl acetate may also be used.

I have discovered, and the invention is in part predicated upon this, that the action of hydroxyl-containing polyvinyl acetal wash primers in polar organic solvents is improved by, strikingly enough, the addition of very small amounts of strong mineral acids to the primer batches. In this way the wash primers are caused to form the desired phosphate coating on surfaces not phosphated by the same wash primer composition not containing strong mineral acid. Moreover, in this way the phosphate coating is formed more rapidly and more consistently than in the absence of the mineral acid, and the coatings are dense and adherent.

The strong mineral acids used in the practice of this aspect of my invention are hydrochloric acid, sulfuric acid and nitric acid.

I have found that the addition of 0.05 ml. of 1.11 M HCl to 100 gm. of a Type II wash primer will cause it to produce rapidly a dense and adherent phosphate coating on some steels that are not phosphated by the same primer without the acid. Such a coating is not adequately corrosion resistant for some purposes but I have found that the addition of between 0.04 and 0.16 percent of HCl, based on the weight of non-volatile solids in a Type II primer gives, according to my experience, the best resistance to corrosion, as determined by salt spray and by humidity tests, of steel treated with such a composition and provided with a top coating. The underfilm corrosion resistance is depreciated, however, according to my experience, when more than 0.8 ml. of HCl of the molarity stated is used. Hydrochloric acid, despite this ability to give satisfactory corrosion resistance, is not preferred because of the narrow limits of its usefulness and its harmful effects outside those limits.

Similarly, my experience has been that to provide adequate underfilm corrosion resistance in the case of sulfuric acid there should not be added more than about 0.4 percent of acid based on the non-volatile solids of Type II primer.

For most purposes I prefer to use nitric acid as the activator, and my experience has been that improvement in corrosion protection is provided over the entire range studied, namely from about 0.032 to about 9 percent of nitric acid based on the non-volatile solids of Type II primer. A particularly desirable consequence of activating these wash primers with nitric acid is that apparently it leaves no acid residue in the coating, and I believe that this is due to reduction of the nitric acid to oxides of nitrogen, and perhaps nitrogen itself, and possibly also to the formation of a volatile ester, such as an organic nitrite, by reaction between the acid and the polar, e. g., alcoholic, solvent in the primer. Regardless of the true mechanism of the disappearance of nitric acid from the phosphate film, I have found that a wash primer containing nitric acid and having a pH of about 1 to 2 will produce after reaction with a steel surface a dry coating which in water extract has a pH of about 5 to 6 when the coating is moistened with distilled water. The advantage of this will appear hereinafter.

Obviously, the strong mineral acid may be added to the wash primer in concentrations other than the molarities stated, the amount being adjusted according to the strength of the acid to supply an amount of acid equivalent to that supplied by the amounts and the molarities just given by way of example. It is to be understood likewise that salts of those strong mineral acids may be used to supply the same effect inasmuch as such salts will in the presence of phosphoric acid and the water that is present in these wash primers give ions of the strong acid. The salts, accordingly, must be those that are soluble in water.

In the case of ferrous metals the phosphoric acid reacts with the iron to form ferrous phosphate which precipitates upon the metallic surface and stops or so retards further reaction before all of the phosphoric acid has reacted, so that an excess of acid is present. This acidity leads to rapid loss of adhesion of the wash primer coating on contact with water, and it interferes with the development of topcoat adhesion. These undesirable consequences are not entirely overcome by the activating action of strong mineral acids just described, since even if all of the phosphoric acid reacted with the underlying iron to form ferrous phosphate the result would not be fully satisfactory under some conditions. Thus, ferrous phosphate is insoluble in water at very low pH, and if all the phosphate were in that form the wash primer film would be more acid than pH 4. Difficulties with adhesion of some topcoats would accordingly be encountered.

I have discovered, and the invention is further predicated on this, that the action of these wash primers is also improved by adding to them a substance that is substantially insoluble in water and in polar organic solvents, such substances being added in an amount such that a water extract of the dried film shows a pH of about 4 or more. Examples of such substances are magnesium oxide, zinc oxide, calcium silicate and magnesium silicate. As will be observed from the foregoing exemplary Type I and Type II wash primers of the prior art, magnesium silicate has been incorporated in them. However, the amounts used were, to repeat, merely sufficient to act as dispersing agents to prevent rapid settling of the other pigments. In this aspect of the present invention materially larger amounts of magnesium silicate or equivalent compounds, such as those just named, are necessary to confer upon the Type II wash primer coating the property of having a pH of the water extract about 4 or greater.

Experience has shown, to repeat, that when orthophosphoric acid is used as the only acidic component of Type II wash primers, the compositions suffer from two defects, namely, that some steels are not phosphated by the composition, and that the film produced has a pH of less than about 4. As pointed out above, this acid condition leads to water sensitivity of the primer film and to poor adhesion of certain classes of subsequently applied topcoats. Orthophosphates other than the alkali metal orthophosphates can be dispersed in polyvinyl acetal solutions to produce stable wash primers. I have found, and a further and major aspect of the invention is predicated on this, that the acidity and consequent water sensitivity of the films produced by these wash primers is suppressed or eliminated by the conjoint inclusion of a strong mineral acid and an orthophosphate other than an alkali metal orthophosphate dispersed in the polyvinyl acetal solution.

I have also found that this combination of strong mineral acid and such an orthophosphate causes the wash primer to coat ferrous metals that otherwise do not develop coatings, or satisfactory coatings, from the same composition without the strong mineral acid, and to provide a corrosion resistant base for topcoat adherence. It is now preferred to use nitric acid for this purpose. Thus, a wash primer activated with alcoholic $HNO_3$ having manganous phosphate dispersed in it and a pH of about 1 to 2 will produce on steel a phosphate coating, and the water extract of the wash primer film will have a pH of 5 to 6. However, various other phosphates may be used such, for example, as chromium phosphate and ammonium or zinc orthophosphates. This aspect of the invention may be exemplified by the following examples:

Example I

| Base grind: | Parts by weight |
|---|---|
| Monomanganous phosphate | 16.7 |
| Vinyl butyral resin | 8.3 |
| Isopropanol, 99% | 52.5 |
| Methyl isobutyl ketone | 22.5 |
| | 100.0 |
| Activator: | |
| Nitric acid (as $HNO_3$) | 4.0 |
| Water | 6.0 |
| Butanol | 90.0 |
| | 100.0 |

1 part by volume of activator is added to 2 parts by volume of base grind. pH of dried film 5–6.

Example II

| Base grind: | Parts by weight |
|---|---|
| Zinc tetraoxy chromate | 6.5 |
| Monomanganous phosphate | 8.0 |
| Vinyl butyral resin | 8.6 |
| Isopropanol, 99% | 54.0 |
| Methyl isobutyl ketone | 22.9 |
| | 100.0 |

Activator:

| | Parts |
|---|---|
| Nitric acid (as $HNO_3$) | 4.0 |
| Water | 6.0 |
| Isopropanol, 99% | 50.0 |
| Butanol | 40.0 |
| | 100.0 |

1 part by volume of activator is added to 2 parts by volume of base grind. Whereas the zinc tetraoxy chromate-phosphoric acid wash primer of Type I, supra, does not produce a visible phosphate coating on steel, the above composition produces an easily seen phosphate coating.

*Example III*

Base grind:

| | Parts by weight |
|---|---|
| Chromium phosphate | 9.0 |
| Magnesium silicate | 2.0 |
| Vinyl butyral resin | 8.8 |
| Isopropanol, 99% | 56.2 |
| Methyl isobutyl ketone | 24.0 |
| | 100.0 |

Activator:

| | |
|---|---|
| Nitric acid (as $HNO_3$) | 4.0 |
| Water | 6.0 |
| Isopropanol, 99% | 50.0 |
| Butanol | 40.0 |
| | 100.0 |

To 2 parts by volume of base is added 1 part of activator. This composition produces a phosphate coating on ferrous metals believed to consist of a mixture of iron and chromium phosphates.

*Example IV*

Base grind:

| | Parts by weight |
|---|---|
| Monoammonium phosphate | 16.7 |
| Vinyl butyral resin | 8.3 |
| Isopropanol, 99% | 45.0 |
| Toluol | 30.0 |
| | 100.0 |

Activator:

| | |
|---|---|
| Nitric acid (as $HNO_3$) | 4.0 |
| Water | 6.0 |
| Isopropanol, 99% | 20.0 |
| Butanol | 40.0 |
| Toluol | 30.0 |
| | 100.0 |

1 part by volume of activator is added to 2 parts by volume of base. This wash primer reacts with ferrous surfaces to form insoluble iron ammonium phosphate.

To control the solubility of the orthophosphate the polarity of the solvent may be balanced between the polarity of the true solvent, such as isopropanol, and the non-polar diluent, such as toluene. This example also illustrates that principle.

*Example V*

Base grind:

| | Parts by weight |
|---|---|
| Zinc phosphate | 16.7 |
| Vinyl butyral resin | 8.3 |
| Isopropanol, 99% | 45.0 |
| Toluol | 30.0 |
| | 100.0 |

Activator:

| | |
|---|---|
| Nitric acid (as $HNO_3$) | 4.0 |
| Water | 6.0 |
| Isopropanol, 99% | 20.0 |
| Butanol | 40.0 |
| Toluol | 30.0 |
| | 100.0 |

1 part by volume of activator is added to 2 parts by volume of base grind.

*Example VI*

Base grind:

| | Parts by weight |
|---|---|
| Zinc phosphate | 4.5 |
| Monoammonium phosphate | 4.5 |
| Vinyl butyral resin | 8.1 |
| Isopropanol, 99% | 52.0 |
| Toluol | 30.9 |
| | 100.0 |

Activator:

| | |
|---|---|
| Nitric acid (as $HNO_3$) | 4.0 |
| Water | 6.0 |
| Isopropanol | 20.0 |
| Butanol | 40.0 |
| Toluol | 30.0 |
| | 100.0 |

1 part by volume of activator is added to 2 parts by volume of base. It is believed that the phosphate coating formed on ferrous surfaces with this wash primer consists of a mixture of zinc ammonium phosphate and iron ammonium phosphate.

For the greatest utility, however, there is additionally dispersed in the wash primer containing strong mineral acid and an orthophosphate a substance that is substantially insoluble in water and in polar organic solvent and which is capable of giving an alkaline reaction. Examples are MgO, CaO, and calcium and magnesium silicates. It is used in an amount such that the water extract of the phosphate film produced will have a pH most suitably of 5.8 or greater, above which pH all of the simple metal phosphates except those of ammonia, the alkali metals and the alkaline earth metals are insoluble. This assures that the pH of the film will be such as to avoid the undesirable acidity and loss or failure of topcoat adhesion in the presence of water that has characterized former wash primers of the types to which this invention is applicable. This aspect of the present invention is exemplified by the following examples:

*Example VII*

In the following example, nitric acid is used to promote phosphate coating formation, and a very small particle size magnesium silicate is used, to create a pH in the dried coating composition in the range of 5–6.

| | Parts by weight |
|---|---|
| Vinyl butyral resin | 9.0 |
| Normal lead chromate | 8.6 |
| Magnesium silicate | 7.0 |
| Isopropanol, 99% | 32.0 |
| Methyl isobutyl ketone | 14.0 |
| 85% phosphoric acid | 3.4 |
| 1.1 Molar $HNO_3$ | 7.0 |
| Butanol | 19.0 |
| | 100.0 |

*Example VIII*

Base grind:

| | Parts by weight |
|---|---|
| Monomanganous phosphate | 8.0 |
| Magnesium oxide | 4.0 |
| Vinyl butyral resin | 8.8 |
| Isopropanol, 99% | 55.0 |
| Methyl isobutyl ketone | 24.2 |
| | 100.0 |

Activator:

| | |
|---|---|
| Nitric acid (as $HNO_3$) | 4.0 |
| Water | 6.0 |
| Isopropanol, 99% | 20.0 |
| Butanol | 40.0 |
| Toluol | 30.0 |
| | 100.0 |

1 part by weight of activator was added to 2 parts by weight of base. The coating composition was applied to clean steel and allowed to dry at room temperature. The pH of a distilled water droplet placed on the composition was between 5 and 6; and upon removal of the organic portion of the coating was solvent, a dense, uniform, tightly adherent phosphate film was found on the metal surface.

Example IX

Base grind: Parts by weight
- Chromium phosphate — 3.0
- Manganese phosphate — 5.0
- Magnesium silicate — 2.0
- Vinyl butyral resin — 10.0
- Isopropanol, 99% — 56.0
- Methyl isobutyl ketone — 24.0

Total: 100.0

Activator:
- Nitric acid (as HNO$_3$) — 4.0
- Water — 6.0
- Isopropanol, 99% — 50.0
- Butanol — 40.0

Total: 100.0

1 part by volume of activator is added to 2 parts by volume of base.

Example X

Base grind: Parts by weight
- Monoammonium phosphate — 8.0
- Magnesium oxide — 4.0
- Vinyl butyral resin — 8.8
- Isopropanol, 99% — 55.0
- Toluol — 24.2

Total: 100.0

Activator:
- Nitric acid (as HNO$_3$) — 4.0
- Water — 6.0
- Isopropanol, 99% — 20.0
- Butanol — 40.0
- Toluol — 30.0

Total: 100.0

As exemplifying the application of the preferred embodiment of the invention to hydroxyl-containing polyvinyl resin other than polyvinyl butyral, the following example is illustrative:

Example XI

Base grind: Parts by weight
- Monomanganous phosphate — 10.0
- Magnesium silicate — 2.0
- 43–50% hydrolyzed polyvinyl acetate — 10.0
- Ethyl alcohol, 95% — 47.0
- Water — 31.0

Total: 100.0

Activator:
- Nitric acid (as HNO$_3$) — 4.0
- Water — 46.0
- Ethyl alcohol, 95% — 20.0
- Butanol — 30.0

Total: 100.0

1 part by volume of activator is added to 3 parts by volume of base. This example illustrates the use of a resin containing a higher percentage of hydroxyl groups than polyvinyl butyral, and which can tolerate large amounts of water.

From the foregoing examples it will be observed that in accordance with this invention there are provided not only improved wash primers of Types I and II, but also satisfactory wash primers containing no chromate.

The polyvinyl butyral used in the foregoing examples was the grade containing 18 to 20 percent vinyl alcohol designated as XYHL by the Carbide and Carbon Chemicals Corporation of New York, New York, while the hydrolyzed polyvinyl acetate was that of from 47 to 88 percent hydrolysis sold under the trade name "Elvanol" by the E. I. Dupont de Nemours and Company, Inc., Wilmington, Delaware.

One type of polyvinyl butyral useful in the practice of this invention contains about 18 to 20 percent by weight of polyvinyl alcohol and about 1 percent of polyvinyl acetate, and it has a viscosity of about 13 to 18 centipoises as determined in a 6 percent by weight solution in methyl alcohol at 20° C. Another type of polyvinyl butyral useful for these purposes contains about 10.5 to 13 percent of polyvinyl alcohol and 1.5 percent of polyvinyl acetate, and it has a viscosity in a 5 percent solution in ethanol at 25° C. of about 18 to 28 centipoises. However, those with the stated range of polyvinyl alcohol but of greater molecular weight may be used to give satisfactory results.

In Example VI if the zinc phosphate and toluol be omitted, the monoammonium phosphate goes into solution and the primer composition is clear and gives especially rapid and complete phosphating as well as a film that is of non-acid character in the presence of water.

The lead chromate used in the examples is that sold as "Imperial A 548" by Imperial Paper and Color Corporation, Glens Falls, New York.

In the compositions of this invention the phosphoric acid as H$_3$PO$_4$ may range from about 5 to 50 percent based upon the weight of resin present.

According to the provisions of the patent statutes, I have explained the principle and mode of practicing my invention and have described what I now consider to represent its best embodiment. However, I desire to have it understood that, within the scope of the appended claims, the invention may be practiced otherwise than as specifically described.

I claim:

1. The combination with a wash primer consisting essentially of lead chromate and a solution in a polar solvent of an hydroxyl-containing polyvinyl acetal and phosphoric acid, of at least one strong mineral acid of the group consisting of hydrochloric, sulfuric and nitric acids, the amount of acid, in percent by weight based on the non-volatile solids content of the primer, being from about 0.04 to about 0.16 percent of HCl, not over about 0.4 percent of H$_2$SO$_4$, and from about 0.032 to about 9 percent of HNO$_3$.

2. A wash primer according to claim 1, said acetal being polyvinyl butyral.

3. A wash primer according to claim 1, said acetal being hydrolyzed polyvinyl acetate.

References Cited in the file of this patent

UNITED STATES PATENTS

| | | |
|---|---|---|
| 2,525,107 | Whiting et al. | Oct. 10, 1950 |
| 2,692,840 | Bell | Oct. 26, 1954 |

FOREIGN PATENTS

| | | |
|---|---|---|
| 514,443 | Great Britain | Nov. 8, 1939 |